(12) United States Patent
Luo et al.

(10) Patent No.: US 12,306,411 B2
(45) Date of Patent: May 20, 2025

(54) OPTICAL IMAGING SYSTEM AND IMAGING DEVICE

(71) Applicants: University of Central Florida Research Foundation, Inc., Orlando, FL (US); Goertek Inc., Shandong (CN)

(72) Inventors: Zhenyi Luo, Orlando, FL (US); Yannanqi Li, Orlando, FL (US); Shin-Tson Wu, Orlando, FL (US); Yi Rao, Shandong (CN)

(73) Assignees: University of Central Florida Research Foundation, Inc., Orlando, FL (US); Goertek Inc., Weifang (CN)

( * ) Notice: Subject to any disclaimer, the term of this patent is extended or adjusted under 35 U.S.C. 154(b) by 0 days.

(21) Appl. No.: 18/436,371

(22) Filed: Feb. 8, 2024

(65) Prior Publication Data

US 2024/0272434 A1 Aug. 15, 2024

Related U.S. Application Data

(60) Provisional application No. 63/444,442, filed on Feb. 9, 2023.

(51) Int. Cl.
| | |
|---|---|
| G02B 27/01 | (2006.01) |
| G02B 27/00 | (2006.01) |
| G02B 27/09 | (2006.01) |
| G02B 27/28 | (2006.01) |
| G02B 27/42 | (2006.01) |
| G02B 27/44 | (2006.01) |

(52) U.S. Cl.
CPC ...... *G02B 27/0172* (2013.01); *G02B 27/0025* (2013.01); *G02B 27/0037* (2013.01); *G02B 27/0955* (2013.01); *G02B 27/283* (2013.01); *G02B 27/286* (2013.01); *G02B 27/4211* (2013.01); *G02B 27/44* (2013.01); *G02B 2027/0116* (2013.01); *G02B 2027/0178* (2013.01)

(58) Field of Classification Search
CPC ............ G02B 27/0025; G02B 27/0037; G02B 27/017; G02B 27/0172; G02B 27/0955; G02B 27/283; G02B 27/286; G02B 27/4211; G02B 27/44; G02B 2027/0116; G02B 2027/0178
See application file for complete search history.

(56) References Cited

U.S. PATENT DOCUMENTS

2019/0285890 A1* 9/2019 Lam .................. G02F 1/133526

* cited by examiner

*Primary Examiner* — Nitin Patel
*Assistant Examiner* — Cory A Almeida
(74) *Attorney, Agent, or Firm* — Baker Botts LLP

(57) ABSTRACT

An optical imaging system and an imaging device are disclosed. The optical imaging system includes: a display assembly, which outputs lights of an image; a lens assembly, which enlarges the image; a polarization converter, wherein the polarization converter is a frequency-dependent polarization converter, which can convert the lights of a first frequency to a first polarization and convert the lights of a second frequency to a second polarization; and an aberration-correcting optical assembly, which is a polarization-dependent planar optics assembly.

9 Claims, 4 Drawing Sheets

(a)

(b)

OPTICAL IMAGING SYSTEM AND IMAGING DEVICE

CROSS-REFERENCE TO RELATED APPLICATIONS

This application claims priority to U.S. Provisional Application No. 63/444,442, filed on Feb. 9, 2023, which is hereby incorporated by reference in its entirety.

FIELD OF THE INVENTION

The present disclosure pertains to optical imaging technical area and more specifically, to an optical imaging system and an imaging device.

BACKGROUND OF THE INVENTION

Refractive optics provide decent color performances while suffering from bulky formfactor and heavy weight since they produce phase patterns utilizing the optical path differences. As comparison, although diffractive planar optics offer ultrathin formfactor, severe chromatic aberrations limit their practical applications.

How to simultaneously provide compact form factor and decent achromatic performances within the field of view is a challenge. Some previous efforts have been made to combine refractive and diffractive optics for mitigating the chromatic aberrations as described in [Wei-Ting Chen, et al. "Broadband achromatic metasurface-refractive optics," Nano Letters 18, 7801-7808 (2018)] and [Tao Zhan, et al. "Practical chromatic aberration correction in virtual reality displays enabled by cost-effective ultra-broadband liquid crystal polymer lenses," Advanced Optical Materials 8, 1901360 (2020)].

However, the system still suffers from the disadvantages of refractive optics. In a head-mounted display (HMD) system, refractive optical elements are still commonly used as the viewing optics to magnify the displayed images. To offer more comfortable wearing experiences, HMDs demand optics with more compact formfactor and lighter weight. As mentioned above, diffractive planar optics offers an ultrathin formfactor, but the severe chromatic aberrations limit its widespread applications in HMDs.

Researchers at North Carolina State University have made some achievements on achromatic diffractive optics as disclosed in [Lingshan Li, et al. "Color-selective geometric-phase lenses for focusing and imaging based on liquid crystal polymer films," Optics Express 30, 2487-2502 (2022)]. However, the fabrication process of this system is quite complex, and the imaging performances still need improvement. Moreover, the field of view is limited and inadequate for practical applications.

Other attempts for achromatic diffractive lenses focus on metalenses as introduced by: 1) Peng Wang, et al. "Chromatic-aberration-corrected diffractive lenses for ultra-broadband focusing," Scientific Reports 6, 21545 (2016); 2) Nabil Mohammad, et al. "Broadband imaging with one planar diffractive lens," Scientific Reports 8, 2799 (2018)]; and 3) Sajan Shrestha, et al. "Broadband achromatic dielectric metalenses," Light: Science & Applications 7, 85 (2018)]. Though color performances are acceptable, the lens apertures of these metalenses are quite small, which cannot satisfy the practical applications in general imaging systems. Meanwhile, the efficiency of these optical elements is relatively low, which also limits their useful applications.

Therefore, there is a demand to achieve decent achromatic imaging performance while keeping a compact formfactor.

SUMMARY OF THE INVENTION

One object of this disclosure is to provide a new technical solution for an optical imaging system.

According to a first aspect of the present disclosure, there is provided an optical imaging system, comprising: a display assembly, which outputs lights of an image; a lens assembly, which enlarges the image; a polarization converter, wherein the polarization converter is a frequency-dependent polarization converter, which can convert the lights of a first frequency to a first polarization and convert the lights of a second frequency to a second polarization; and an aberration-correcting optical assembly, which is a polarization-dependent planar optics assembly.

According to a second aspect of the present disclosure, there is provided an imaging device including the optical imaging system according to an embodiment.

According to an embodiment of this disclosure, a performance of an imaging system may be improved.

Further features of the present disclosure and advantages thereof will become apparent from the following detailed description of exemplary embodiments according to the present disclosure with reference to the attached drawings.

DETAILED DESCRIPTION OF THE EMBODIMENTS

Figure 1:
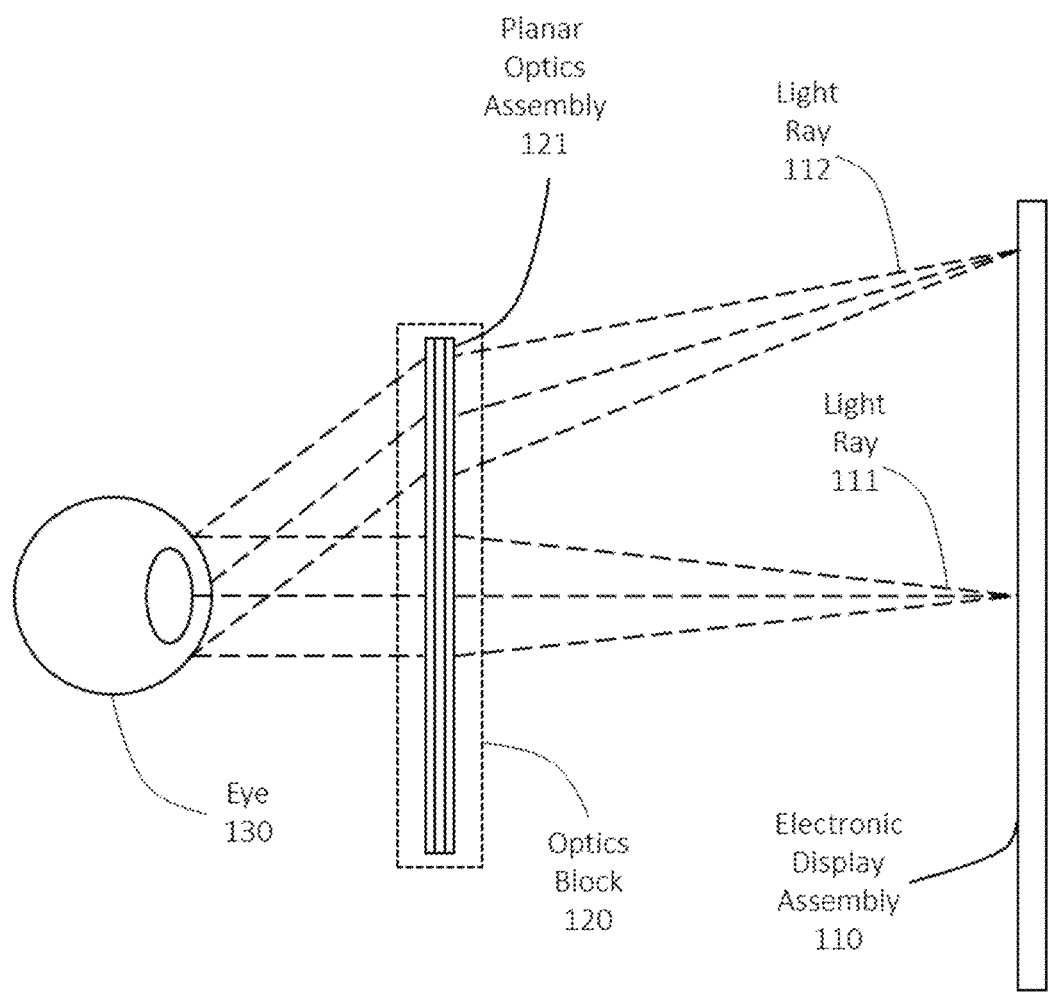
FIG. 1 is a schematic cross-sectional diagram of an optical imaging system according to an exemplary virtual reality application embodiment of the disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In this disclosure, an imaging system is proposed to at least partially relieve an aberration of an imaging system.

In an embodiment, an optical imaging system or beam deflecting system disclosed here can provide achromatic imaging and deflecting performances with diffractive planar optics while remaining an ultrathin formfactor.

In an embodiment, an optical imaging system according to an embodiment includes: a display assembly, which outputs lights of an image; a lens assembly; a polarization converter; and an aberration-correcting optical assembly. The lens assembly enlarges the image. The lens assembly may produce aberrations.

In an embodiment, the lights from the display assembly are polarized lights. For example, the display assembly comprises: a display component, which generates the lights of the image; and a first circular polarizer, which converts the lights from the display component into circular polarization lights.

In an embodiment, the lens assembly is a planar lens assembly. For example, the planar lens assembly is a planar diffractive lens assembly.

In an embodiment, the polarization converter is a frequency-dependent polarization converter, which can convert the lights of a first frequency to a first polarization and convert the lights of a second frequency to a second polarization. In an example, the polarization converter reverts the polarization of the light of the first frequency and keeps the polarization of the light of the second frequency. In another example, the polarization converter reverts the polarization of the light of the second frequency and keeps the polarization of the light of the first frequency. For example, the first frequency is higher than the second frequency. For example, the light of the first frequency is a blue light. For example, the light of the second frequency is a red light.

In an embodiment, the first polarization is one of the right-handed and left-handed circular polarizations, and the second polarization is another one of the right-handed and left-handed circular polarizations.

In an embodiment, the aberration-correcting optical assembly is a polarization-dependent planar optics assembly. The aberration-correcting optical assembly can provide one of a positive or negative power for the light of the first frequency to eliminate chromatic aberrations in the image. The aberration-correcting optical assembly can provide another one of the positive or negative power for the light of the second frequency to eliminate chromatic aberrations in the image.

In an embodiment, the aberration-correcting optical assembly is a diffractive optical element, such as a geometric phase lens or grating. For example, the diffractive optical element provides deflection degrees for the lights based on their wavelengths and provide positive and negative powers for the lights based on their polarizations. Here, diffractive optical element can provide opposite powers for different polarizations. For the same polarization, the diffractive optical element can provide deflection degrees for the lights based on their wavelength so that the aberration-correction can be achieved with respect to a continuous frequency spectrum of an image light. For example, the aberration-correcting optical assembly is a liquid crystal diffractive optical element. For example, the aberration-correcting optical assembly is an RB optics assembly. For example, the aberration-correcting optical assembly is a planar RB optics assembly.

The arrangement of the units in the optical imaging system can be adjusted according to the requirement of an application. In an embodiment, the lens assembly is placed in front of the display assembly, the polarization converter is placed after the planar lens assembly, and the aberration-correcting optical assembly is placed after the polarization converter. In another embodiment, the polarization converter is placed in front of the display assembly, the aberration-correcting optical assembly is placed after the polarization converter and the lens assembly is placed after the aberration-correcting optical assembly.

In an embodiment, the display assembly outputs the lights of the image of the first polarization. The lens assembly enlarges the image and coverts the lights of the first polarization to a second polarization. The polarization converter reverts the light of the first frequency in the lights to the first polarization and keeps the second polarization of the light of the second frequency in the lights. The aberration-correcting optical assembly provides deflection degrees for the lights based on their wavelengths and provides positive and negative powers for the lights based on their polarizations. In an example, the aberration-correcting optical assembly provides a positive power for the light of the second polarization and provides a negative power for the light of the first polarization. In another example, the aberration-correcting optical assembly provides a positive power for the light of the first polarization and provides a negative power for the light of the second polarization.

In some embodiments, an optical imaging system or beam deflecting system employing diffractive planar optics is provided. The system architecture may be used in beam deflecting devices, HMDs for virtual reality (VR), augmented reality (AR), other optical imaging or viewing systems. The diffractive planar optics system can be used in above device and/or systems to provide achromatic performances while remaining an ultrathin formfactor. The diffractive planar optics exhibit polarization-dependent functionality, broadband high-efficiency in the visible spectrum.

In some embodiments, a head-mounted display (HMD) comprises a controllable optical graphics-generating display apparatus and an optical viewing apparatus. The optical graphics-generating display apparatus may emit polarized light. The optical viewing apparatus may include one or more waveplates or retarders to convert the polarization state of the light from display apparatus into circular polarization. The optical viewing apparatus may include one or more polarization-dependent planar lenses. The diffractive planar lenses may convert the polarization handedness of the incident light.

In some embodiments, an HMD comprises a controllable optical graphics-generating display apparatus and an optical viewing apparatus. The optical graphics-generating display apparatus may emit unpolarized light. The optical viewing apparatus may include one or more waveplates or retarders to convert the polarization state of the light from display apparatus into circular polarization. The optical viewing apparatus may include one or more polarization-dependent planar lenses. The diffractive planar lenses may convert the polarization handedness of the incident light.

In some embodiments, a beam deflecting device comprises a controllable optical beam-generating apparatus and an optical deflecting apparatus. The optical beam-generating apparatus may emit polarized light. The optical deflecting apparatus may include one or more waveplates or retarders to convert the polarization state of the light from beam-generating apparatus into circular polarization. The optical deflecting apparatus may include one or more polarization-dependent planar gratings. The diffractive planar gratings may convert the polarization handedness of the incident light.

In some embodiments, a beam deflecting device comprises a controllable optical beam-generating apparatus and an optical deflecting apparatus. The optical beam-generating apparatus may emit unpolarized light. The optical deflecting apparatus may include one or more waveplates or retarders to convert the polarization state of the light from beam-generating apparatus into circular polarization. The optical deflecting apparatus may include one or more polarization-dependent planar gratings. The diffractive planar gratings may convert the polarization handedness of the incident light.

In various embodiments, the optical imaging system may include, alone or in various combinations as one skilled in the art would understand, the following features and/or elements. In an example, image output from the display is converted to circular polarization. In another example, the diffractive planar optics can be a geometric phase lens or grating. In another example, the optical imaging system may comprise a support structure such that the optical imaging system is wearable by a viewer.

FIG. 1 schematically illustrates an optical imaging system of a head-mounted display system, in accordance with one embodiment. The display system comprises a display assembly such as a programmable/controllable (virtual image) electronic display assembly 110 and optically followed by an optics block 120, which is comprised of at least one planar optics assembly 121, and then followed by the viewer's eye 130.

The display component 110 can be a conventional LCD (liquid crystal display), an OLED (organic light-emitting diode) display, mini-LED backlit LCD, an LCoS (liquid-crystal-on-silicon) display, a micro-LED display, a fiber scanning display, or other display components as known in the art. The display component 110 outputs or is adapted to output a polarized light (virtual) image. Typically, display components such as LCD and LCoS displays produce polarized outputs. If the display output is not inherently polarized, as produced by, e.g., a micro-LED display, an OLED display, or a fiber scanning display, a polarizer and a waveplate may be disposed on the output side of the display component to generate a desired polarization state of the output light. Light from the display assembly may transmit the optics block at normal incidence as light ray 111, or at an oblique incidence as light ray 112. The optics block 120 may include the planar optics assembly 121.

Figure 2:
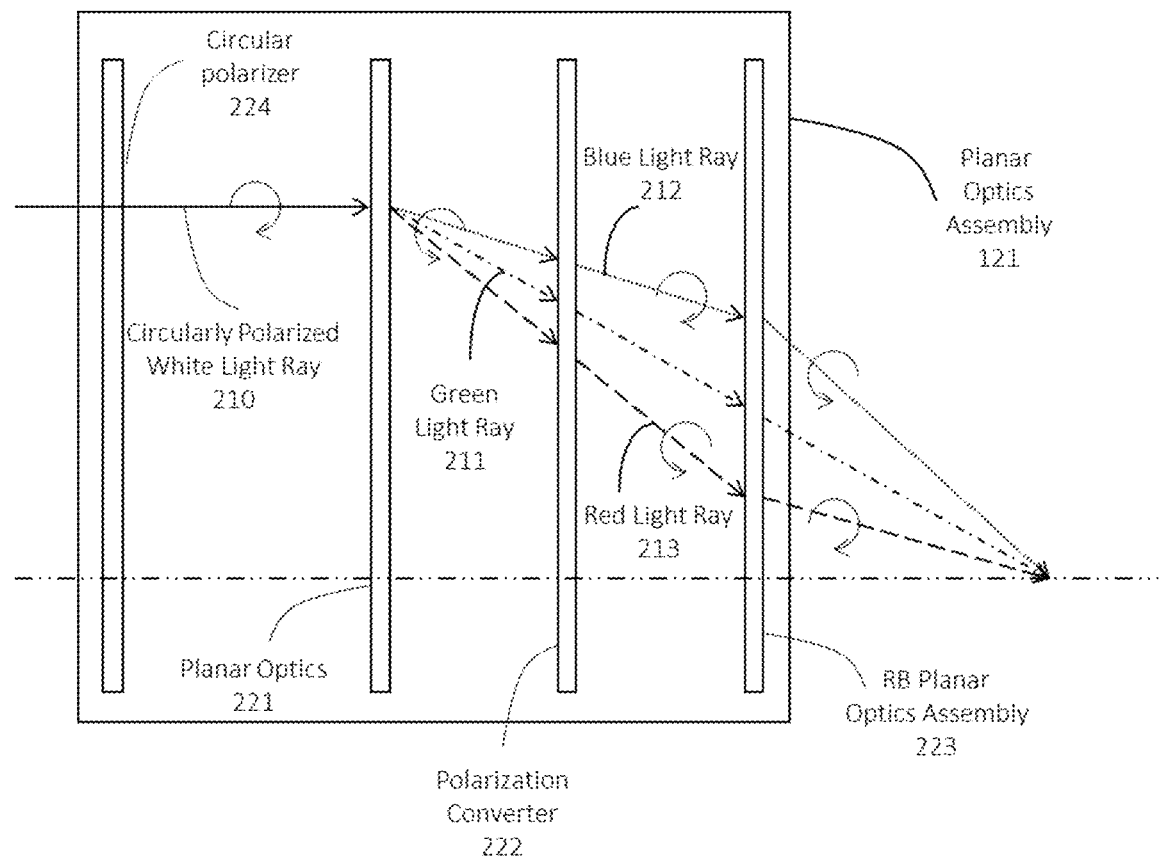
FIG. 2 is a schematic cross-sectional diagram of the planar optics assembly according to one embodiment.

FIG. 2 depicts the details of the planar optics assembly 121, in accordance with one embodiment. The circular polarizer 224 may be needed to convert the polarization state of the light from electronic display assembly 110 into circular polarization. If the light from electronic display assembly 110 is linearly polarized, then the circular polarizer can be replaced with a quarter-wave plate at the same position. In an embodiment, the electronic display assembly 110 can generate a desired image light and the circular polarizer 224 can be omitted.

The planar optics assembly 121 may include a lens assembly such as planar optics 221; a polarization converter 222; and an aberration-correcting optical assembly such as polarization-dependent RB planar optics assembly 223.

The planar optics 221, 222, and 223 can be placed in touch. In FIG. 2, to show the principle, these optics are separated to understand the polarization states. These planar optics may be preferably a liquid crystal polymer lens or grating similar to that disclosed in [Nelson V. Tabirian, et al. "Diffractive waveplate lenses for correcting aberrations and polarization-independent functionality." U.S. Pat. No. 10,120,112, November 6, (2018)]. Here, the input RGB lights are considered for describing the underlying operation principles while the same idea can be extended to other spectral range, such as infrared or ultraviolet. The circularly polarized white light ray 210 first passes through the planar optics 221, and RGB lights are diffracted into different angles due to the dispersion of diffractive optics. The polarization states may be switched to opposite circular polarization state depending on the properties of the planar optics 221. A broadband circular polarizer may be provided to keep the same polarization states for all the input light. Then, the polarization converter 222 is used to control the polarization states of the input light. After passing through the polarization converter 222, the polarization states of red light 213 and blue light 212 are different to obtain negative or positive optical power from the polarization-dependent RB planar optics assembly 223, which is effective for red light and blue light but does not affect the green light 211. The RB planar optics assembly 223 works as the compensation element to eliminate the chromatic aberrations induced by the planar optics 221 for all RGB lights. The planar optics 221 and RB planar optics assembly 223 may be planar lenses or planar gratings for the purpose of imaging or deflecting. The polarization converter 222 may also be a planar element or other optical element that can be used to manipulate the polarization states of RGB lights.

For a more general case, the chromatic aberrations between $\lambda 1$, $\lambda 2$ and $\lambda 3$ ($\lambda 1 < \lambda 2 < \lambda 3$), whose optical power is K1, K2 and K3 (K1<K2<K3) from the diffractive planar optics 221, can be corrected. Under such conditions, the RB planar optics assembly 223 can provide a positive optical power $\Delta K1$ to $\lambda 1$ and a negative optical power $\Delta K3$ to $\lambda 3$ and be ineffective to $\lambda 2$. The relationship between $\Delta K1$ and $\Delta K3$ is determined by the properties of the RB planar optics assembly 223. In an experimental demonstration, the polarization converter 222 and RB planar optics assembly 223 are both liquid-crystal-based Pancharatnam-Berry optical elements. Therefore, $\Delta K1/\lambda 1 = -\Delta K3/\lambda 3$. Other polarization-dependent diffractive optics can also be applied to mitigate the optical power difference while the underlying relationship between $\Delta K1$ and $\Delta K3$ may be different. After correcting the chromatic aberrations between $\lambda 1$ and $\lambda 3$, $\lambda 2$ can properly be chosen to achieve an achromatic system.

Figure 3:
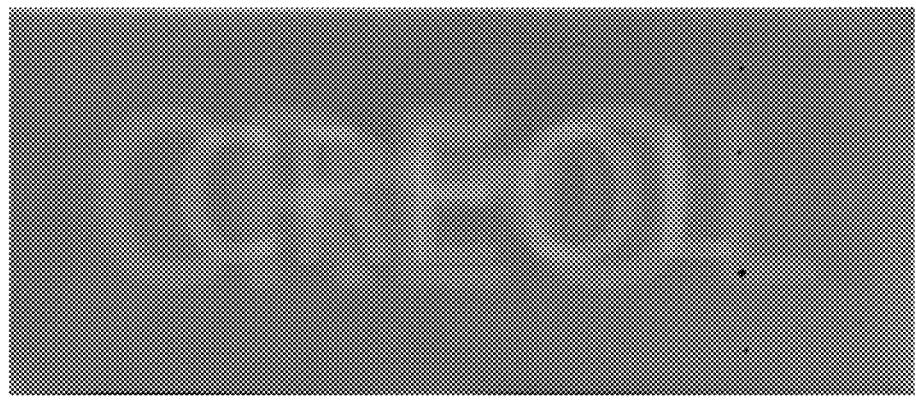
FIG. 3 shows a preliminary experimental result of a device exploiting the aberration correction technique solution according to an embodiment.
Figure 3:
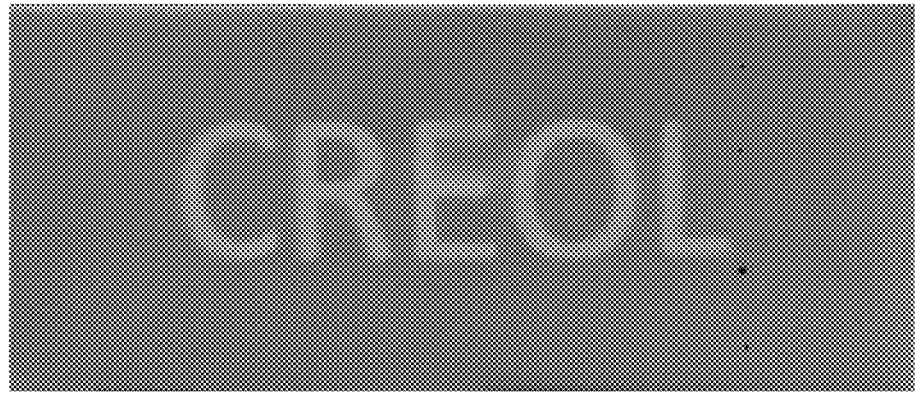

FIG. 3 shows preliminary experimental results of a device exploiting the aberration correction solution disclosed in an embodiment. A picture shows the imaging results of "CREOL" that is projected using a laser projector. FIG. 3(a) shows the perceived image without the polarization converter 222 and RB planar optics assembly 223. The white objects, which can be regarded as the superposition of RGB objects, generate three images with different sizes and locations because RGB colors have different magnifications. As a result, severe dispersion is observed. FIG. 3(b) shows the perceived image with the planar optics assembly 121. The chromatic aberration is almost invisible in FIG. 3(b) after controlling the polarization states and providing positive or negative power for red light and blue light to eliminate the chromatic aberrations.

Figure 4:
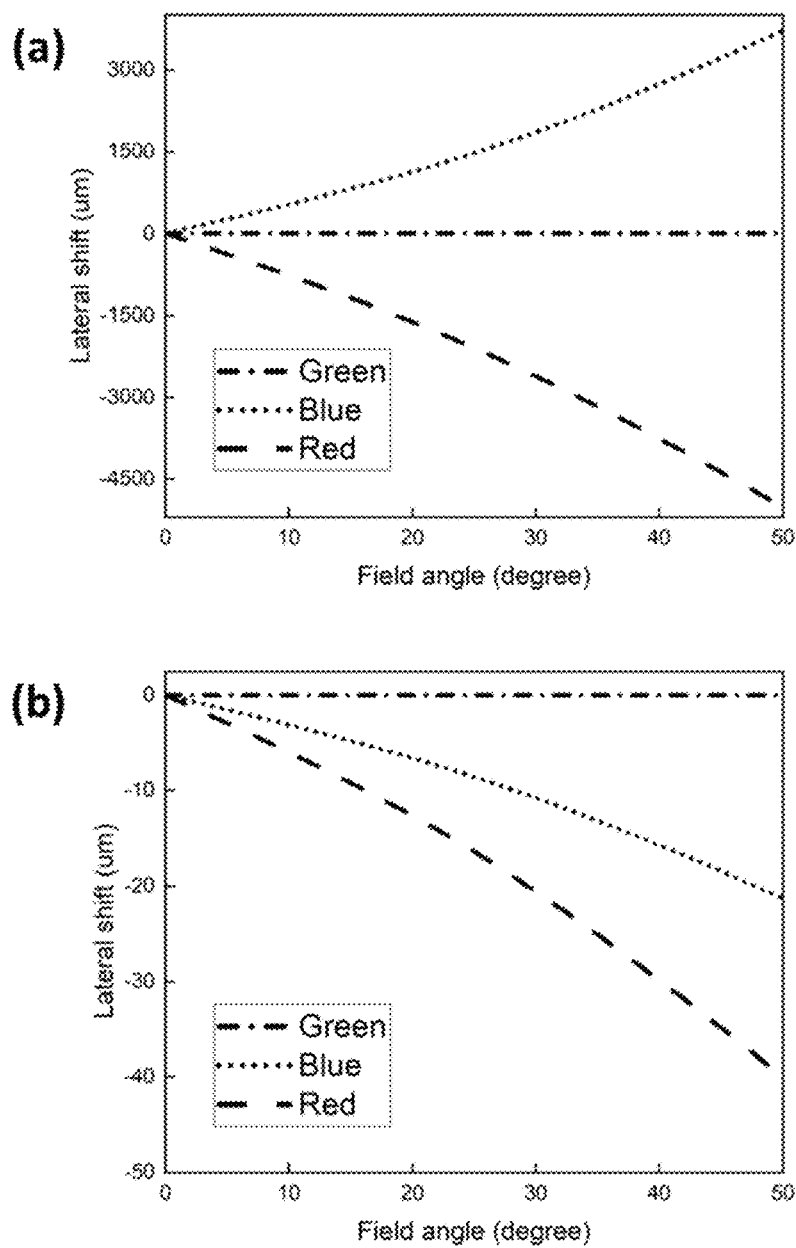
FIG. 4 shows simulated results of lateral color shift to verify the achromatic performance.

FIG. 4 is the simulated results of lateral color shift to verify the achromatic performance. A large field angle of 50 degrees which corresponds to 100-degree field of view was considered. FIG. 4(a) shows the severe chromatic aberrations of planar optics 221. The green light is regarded as the reference and the lateral shift of blue and red lights gradually increases as the field angle increases. The shift at 50 degrees reaches over 3000 micrometers for blue light and red light. Combined with the polarization converter 222 and RB planar optics assembly 223, the corrected lateral shift is shown in FIG. 4(b). The shift decreases to less than 40 micrometers, which indicates that the lateral color shift has been reduced by nearly ~100 times at large field angles.

The disclosure can also be summarized as below.

In an embodiment, an optical imaging apparatus in head-mounted displays or general imaging systems comprising: a display assembly, which outputs light of an image; a planar lens assembly, placed in front of the display assembly to enlarge the image and produce aberrations; and a polarization converter, placed after the planar lens assembly; and an RB planar lens assembly, placed after the polarization converter to correct the aberrations. The light output by the display assembly may be a circular polarization light. The circular polarization light is right-handed or left-handed.

In an example, the display assembly comprises a display component; and a first circular polarizer, which converts light from the display component into the circular polarization light. For example, the display component is an LCD, an OLED display, a mini-LED backlit LCD, an LCoS display, a micro-LED display, a laser projector, a fiber scanning display, or a laser bean scan display.

In an example, the light from the display component is unpolarized or linear polarized light and the first circular polarizer is replaced by a quarter-wave plate.

In an example, the planar lens assembly is a diffractive lens. A broadband circular polarizer may be placed after the first planar lens assembly to keep the same polarization states for all the input light.

The polarization converter controls the polarization states of output light. The handedness of output red light and blue light is opposite after passing through the polarization converter.

The RB planar lens assembly includes: a polarization-dependent planar optics, which receives the right-handed or left-handed circular polarization light, and which converts most of the right-handed or left-handed circular polarization light into left-handed or right-handed circular polarization light and leaks the rest right-handed or left-handed circular polarization light.

In an example, the optical assembly includes: a polarization-dependent planar optics, which receives the circular polarization light output by the display assembly, and which converts most of the circular polarization light into an opposite handedness circular polarization light and leaks the rest circular polarization light with original handedness.

For example, the polarization-dependent planar optics includes a liquid crystal component. The polarization-dependent planar optics may include a liquid crystal diffractive film.

For example, the polarization-dependent planar optics is made of liquid crystal cell. The polarization-dependent planar optics may be made of liquid crystal polymer.

For example, the polarization-dependent planar optics includes transparent substrates and a liquid crystal diffractive film. For example, the polarization-dependent planar optics includes a liquid crystal diffractive cell. The achromatic performances can be applied to other wavelength ranges by controlling the spectrum of RB planar optics.

A person skilled in the art shall understand that the placement order of the optical element is reverse. The circularly polarized light first passes through the polarization converter to control the polarization states. Then, the output light passes through the polarization dependent RB planar lens assembly. Next, another polarization converter is applied for polarization states manipulation. Finally, the light passes through the planar lens assembly.

In another embodiment, a beam deflecting apparatus comprises: a beam generation assembly, which outputs light of an image; a planar deflector assembly, placed in front of the beam generation assembly to enlarge the image and produce aberrations; a polarization converter, placed after the planar deflector assembly; and an RB planar deflector assembly, placed after the polarization converter to correct the aberrations. The beam deflecting apparatus may also be an optical imaging device.

In an example, the beam generation assembly comprises a display component; and a first circular polarizer, which converts light from the display component into the circular polarization light.

In an example, the planar deflector assembly is a diffractive deflector. A broadband circular polarizer may be placed after the first planar deflector assembly to keep the same polarization states for all the input light.

In an example, the optical assembly includes: a polarization-dependent planar optics, which receives the circular polarization light output by the beam generation assembly and converts the circular polarization light into an opposite handedness circular polarization light.

A person skilled in the art shall understand that the placement order of the optical element is reverse. The circularly polarized light first passes through the polarization converter to control the polarization states. Then, the output light passes through the polarization dependent RB planar deflector assembly. Next, another polarization converter is applied for polarization states manipulation. Finally, the light passes through the planar deflector assembly.

Figure 5:
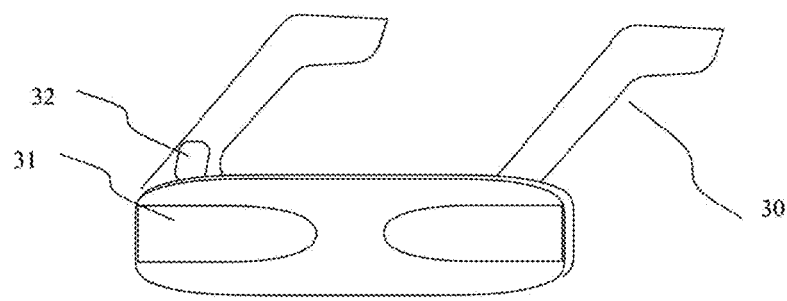
FIG. 5 shows an example of an imaging device according to an embodiment.

FIG. 5 shows an example of an imaging device according to an embodiment. The imaging device 30 includes the optical imaging system 31 as described above. The imaging device 30 may include the optical imaging system 31 and a relative controller 32. The imaging device 30 may be beam deflecting devices, head-mounted displays (HMDs for virtual reality (VR), augmented reality (AR), other optical imaging or viewing systems), head-up displays and general imaging systems. Such devices can benefit from aberration correction and/or ultrathin formfactor of the imaging system disclosed here.

Although some specific embodiments of the present invention have been demonstrated in detail with examples, it should be understood by a person skilled in the art that the above examples are only intended to be illustrative but not to limit the scope of the present disclosure.

What is claimed is:

1. An optical imaging system, comprising:
   a display assembly, adapted to output light corresponding to an image;
   a lens assembly, adapted to enlarge the image;
   a polarization converter, wherein the polarization converter includes a frequency-dependent polarization converter, configured to convert the light at a first frequency to a first polarization and convert the light at a second frequency to a second polarization; and
   an aberration-correcting optical assembly, including a polarization-dependent planar optics assembly;
   wherein the aberration-correcting optical assembly includes a diffractive optical element, providing deflection degrees for the light based on wavelengths thereof and providing positive and negative powers for the light based on the polarizations thereof.

2. The optical imaging system according to claim 1, wherein the light from the display assembly includes polarized light.

3. The optical imaging system according to claim 1, wherein the lens assembly includes a planar lens assembly, and the first frequency is higher than the second frequency.

4. The optical imaging system according to claim 1, wherein the first polarization is one of a right-handed polarization and a left-handed circular polarization, and the second polarization is the other of the right-handed and left-handed circular polarizations.

5. The optical imaging system according to claim 1, wherein the polarization converter is configured to revert the polarization of the light at the first frequency and keep the polarization of the light at the second frequency, or revert the polarization of the light at the second frequency and keep the polarization of the light at the first frequency.

6. The optical imaging system according to claim 1, wherein the aberration-correcting optical assembly is configured to provide one of a positive or negative power for the light at the first frequency and provide the other of the positive or negative power for the light at the second frequency to eliminate chromatic aberrations in the image.

7. The optical imaging system according to claim 1, wherein the lens assembly is positioned in front of the display assembly, the polarization converter is positioned after the display assembly, and the aberration-correcting optical assembly is positioned after the polarization converter, or wherein the polarization converter is positioned in front of the display assembly, the aberration-correcting optical assembly is positioned after the polarization converter and the lens assembly is positioned after the aberration-correcting optical assembly.

8. The optical imaging system according to claim 1, wherein the display assembly is configured to output the light of the image at the first polarization;

wherein the lens assembly is configured to enlarge the image and covert the light at the first polarization to the second polarization;

wherein the polarization converter is configured to revert the light at the first frequency to the first polarization and keep the second polarization of the light at the second frequency.

9. An imaging device, comprising an optical imaging system according to claim 1.

* * * * *